United States Patent
Ishiwa et al.

(10) Patent No.: US 6,876,422 B2
(45) Date of Patent: Apr. 5, 2005

(54) LIQUID-CRYSTAL DISPLAY UNIT HAVING A THIRD BOARD HAVING AT LEAST ONE OF A SIGNAL-LINE DRIVE CIRCUIT AND A SCANNING-LINE DRIVE CIRCUIT

(75) Inventors: Masaru Ishiwa, Kawasaki (JP); Susumu Okazaki, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 132 days.

(21) Appl. No.: 09/930,048

(22) Filed: Aug. 15, 2001

(65) Prior Publication Data

US 2002/0080314 A1 Jun. 27, 2002

(30) Foreign Application Priority Data

Dec. 22, 2000 (JP) ........................................ 2000-391366

(51) Int. Cl.[7] ........................ G02F 1/1345; H01M 10/18
(52) U.S. Cl. ........................ 349/149; 349/151; 349/152; 428/209
(58) Field of Search ................................ 349/151, 152, 349/149; 428/209

(56) References Cited

U.S. PATENT DOCUMENTS

| | | | |
|---|---|---|---|
| 4,917,466 A | * | 4/1990 | Nakamura et al. .......... 349/151 |
| 4,985,663 A | * | 1/1991 | Nakatani ................. 315/169.3 |
| 5,089,750 A | * | 2/1992 | Hatada et al. ........... 315/169.3 |
| 5,384,000 A | * | 1/1995 | Nishiguchi ................... 156/297 |
| 5,502,889 A | * | 4/1996 | Casson et al. ................. 29/830 |
| 5,688,584 A | * | 11/1997 | Casson et al. ............... 428/209 |
| 5,838,412 A | * | 11/1998 | Ueda et al. .................. 349/150 |
| 5,959,709 A | * | 9/1999 | Asada et al. ................. 349/150 |
| 5,969,783 A | * | 10/1999 | Takiar et al. ................ 349/150 |
| 6,025,893 A | * | 2/2000 | Kadowaki et al. ............ 349/58 |
| 6,091,475 A | * | 7/2000 | Ogino et al. ................. 349/149 |
| 6,498,636 B1 | * | 12/2002 | Mathew et al. ............. 349/187 |
| 6,501,525 B2 | * | 12/2002 | Huang et al. ............... 349/150 |

FOREIGN PATENT DOCUMENTS

| | | | |
|---|---|---|---|
| JP | 64-44918 | * | 2/1989 |
| JP | 05066386 A | | 3/1993 |

* cited by examiner

*Primary Examiner*—Long Pham
*Assistant Examiner*—Shrinivas H. Rao
(74) *Attorney, Agent, or Firm*—Greer, Burns & Crain, Ltd.

(57) ABSTRACT

A liquid-crystal display unit is provided. The liquid-crystal display unit comprises a first board having a signal line, a scanning line and a pixel electrode, a second board having a common electrode, a liquid-crystal layer provided between the first board and the second board, and a third board having at least one of a signal-line driver driving the signal line and a scanning-line driver driving the scanning line. The second board is positioned to oppose the first board. The third board is separated from the first board and the second board.

4 Claims, 6 Drawing Sheets

LIQUID-CRYSTAL DISPLAY UNIT HAVING A THIRD BOARD HAVING AT LEAST ONE OF A SIGNAL-LINE DRIVE CIRCUIT AND A SCANNING-LINE DRIVE CIRCUIT

BACKGROUND OF THE INVENTION

1. Field of the Invention

The present invention generally relates to a liquid-crystal display unit, and more particularly, to a liquid-crystal display unit displaying an image on a liquid-crystal panel.

2. Description of the Related Art

FIG. 1 is an illustration showing a structure of a conventional liquid-crystal display unit. As shown in FIG. 1, a liquid-crystal display unit 11 comprises a pixel electrode board 1, thin-film transistors (TFTs) 2, signal lines 3, scanning lines 4, a common electrode board 5, a common electrode 6, a liquid-crystal layer 7, a signal-line drive circuit 9, a scanning-line drive circuit 10, and pixel electrodes 23. The TFTs 2, the signal lines 3, the scanning lines 4, the pixel electrodes 23, the common electrode 6, the liquid-crystal layer 7 provided between the pixel electrodes 23 and the common electrode 6, compose a liquid-crystal panel.

FIG. 2 is a plan view showing a layout of a pixel matrix formed on the pixel electrode board 1 shown in FIG. 1. As shown in FIG. 1 and FIG. 2, the TFTs 2, the pixel electrodes 23 each connected to the TFT 2, the signal lines 3, the scanning lines 4, the signal-line drive circuit 9 driving the signal lines 3, and the scanning-line drive circuit 10 driving the scanning lines 4 are formed on the pixel electrode board 1. The common electrode 6 is formed on the common electrode board 5.

Also, as shown in FIG. 2, the pixel electrodes 23 are formed in the form of a matrix on the pixel electrode board 1. The signal line 3 supplies an image signal to the pixel electrode 23. The scanning line 4 transmits a control signal to a gate of the TFT 2, the control signal turning on/off the TFT 2 which is connected to the pixel electrode 23 so as to regulate writing of data to each pixel.

It is noted that a unit like the liquid-crystal display unit 11 that drives the signal lines 3 and the scanning lines 4 so as to display an image by means of liquid crystal via the pixel electrodes 23 formed in the form of a matrix is referred to as an "active matrix liquid-crystal display unit".

On the other hand, there is also another conventional liquid-crystal display unit, as a second type of the active matrix liquid-crystal display unit, comprising a printed circuit board formed of glass epoxy resin, the printed circuit board having the signal-line drive circuit 9 and the scanning-line drive circuit 10, and a pixel electrode board formed of glass, the pixel electrode board having the pixel electrodes 23, the signal lines 3 and the scanning lines 4, wherein the printed circuit board and the pixel electrode board are connected to each other by a flexible cable.

However, the conventional liquid-crystal display unit 11 as the active matrix liquid-crystal display unit shown in FIG. 1, especially a liquid-crystal display unit of, so to speak, an all-peripheral-circuits-in-one type having an operating semiconductor layer of a TFT formed of polycrystalline silicon (polysilicon: p-Si), is provided with more than multimillion pixel electrodes 23 and a multitude of circuits such as the signal-line drive circuit 9 and the scanning-line drive circuit 10 both consisting of numerous circuit components, all of which electrodes and circuits are formed on the pixel electrode board 1; therefore, such a conventional liquid-crystal display unit incurs a high possibility that at least one of those electrodes and circuits thereof be manufactured inferiorly. Then, when even one of those elements is actually manufactured inferiorly, the pixel electrode board 1 falls out of use even though all other elements function normally; thus, the conventional liquid-crystal display units suffers a problematically poor yield rate.

On the other hand, the above-mentioned second type of the active matrix liquid-crystal display unit is difficult to design because of the structure thereof in which the printed circuit board and the pixel electrode board having different coefficients of thermal expansion are connected to each other by a flexible cable. Furthermore, the above-mentioned second type of the active matrix liquid-crystal display unit provides little reliability in operation since conditions in the connection part vary depending on the operating temperatures.

SUMMARY OF THE INVENTION

It is a general object of the present invention to provide an improved and useful liquid-crystal display unit and a manufacturing method thereof in which the above-mentioned problems are eliminated.

A more specific object of the present invention is to provide a liquid-crystal display unit which can have an increased yield rate and can provide enhanced reliability in operation, as well as a manufacturing method thereof.

In order to achieve the above-mentioned objects, there is provided according to one aspect of the present invention a liquid-crystal display unit comprising:

a first board having a signal line, a scanning line and a pixel electrode;

a second board having a common electrode, the second board opposing the first board;

a liquid-crystal layer provided between the first board and the second board; and a third board having at least one of a signal-line driver driving the signal line and a scanning-line driver driving the scanning line, the third board being separate from the first board and the second board.

According to the present invention, the third board having at least one of the signal-line driver and the scanning-line driver can be formed separately from the first board and the second board. Therefore, the first board, the second board and the third board can be manufactured without being influenced by each other.

Other objects, features and advantages of the present invention will become more apparent from the following detailed description when read in conjunction with the accompanying drawings.

DETAILED DESCRIPTION OF THE PREFERRED EMBODIMENTS

Figure 1:
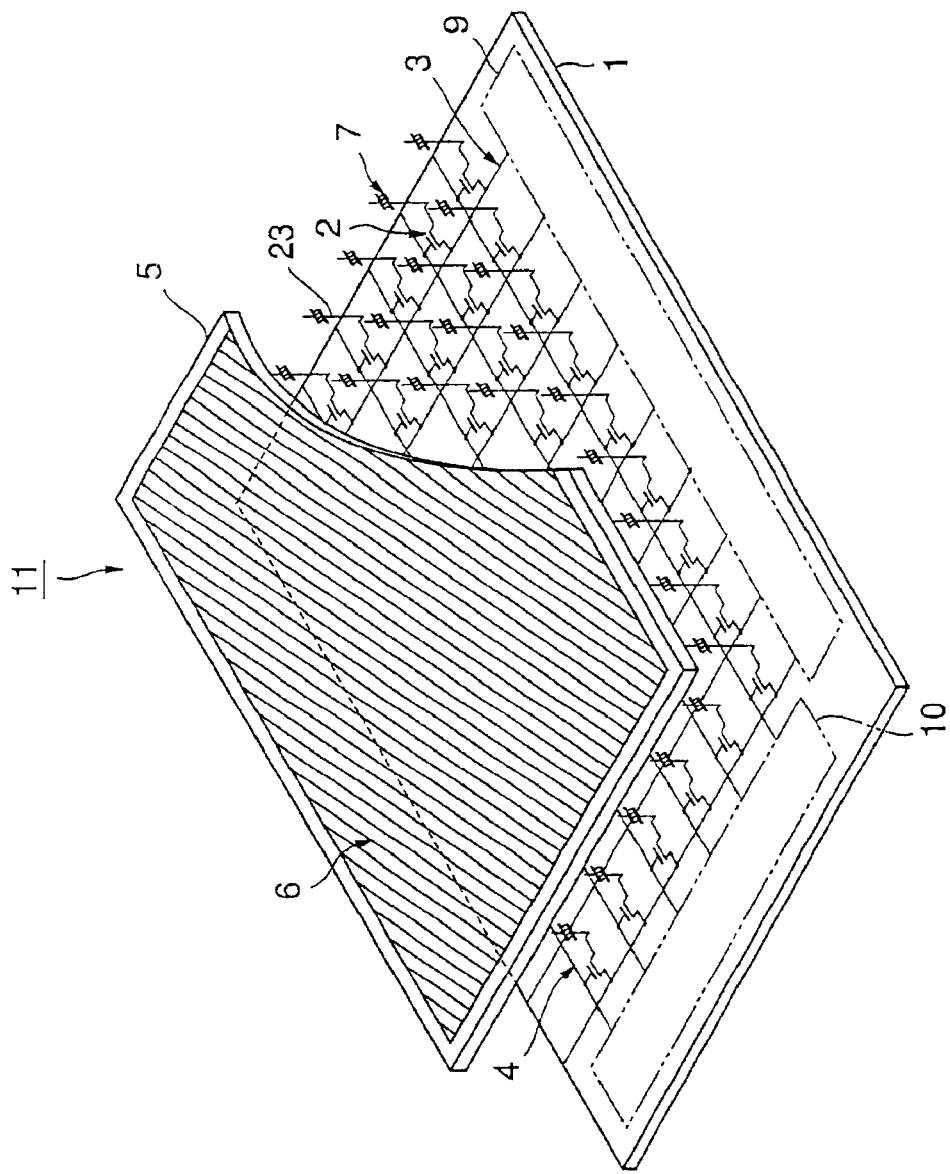
FIG. 1 is an illustration showing a structure of a conventional liquid-crystal display unit.
Figure 2:
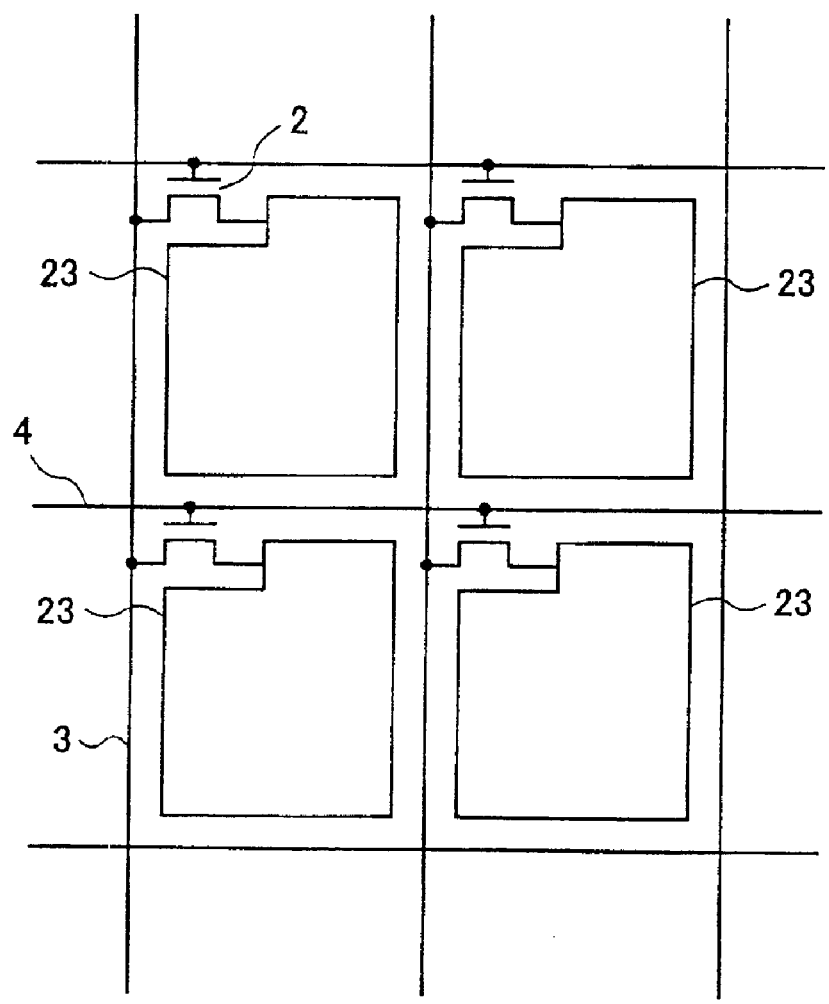
FIG. 2 is a plan view showing a layout of a pixel matrix formed on a pixel electrode board shown in FIG. 1.

A description will now be given, with reference to the drawings, of embodiments according to the present invention. Elements in the drawings that are identical or equivalent are referenced by the same characters.

Figure 3:
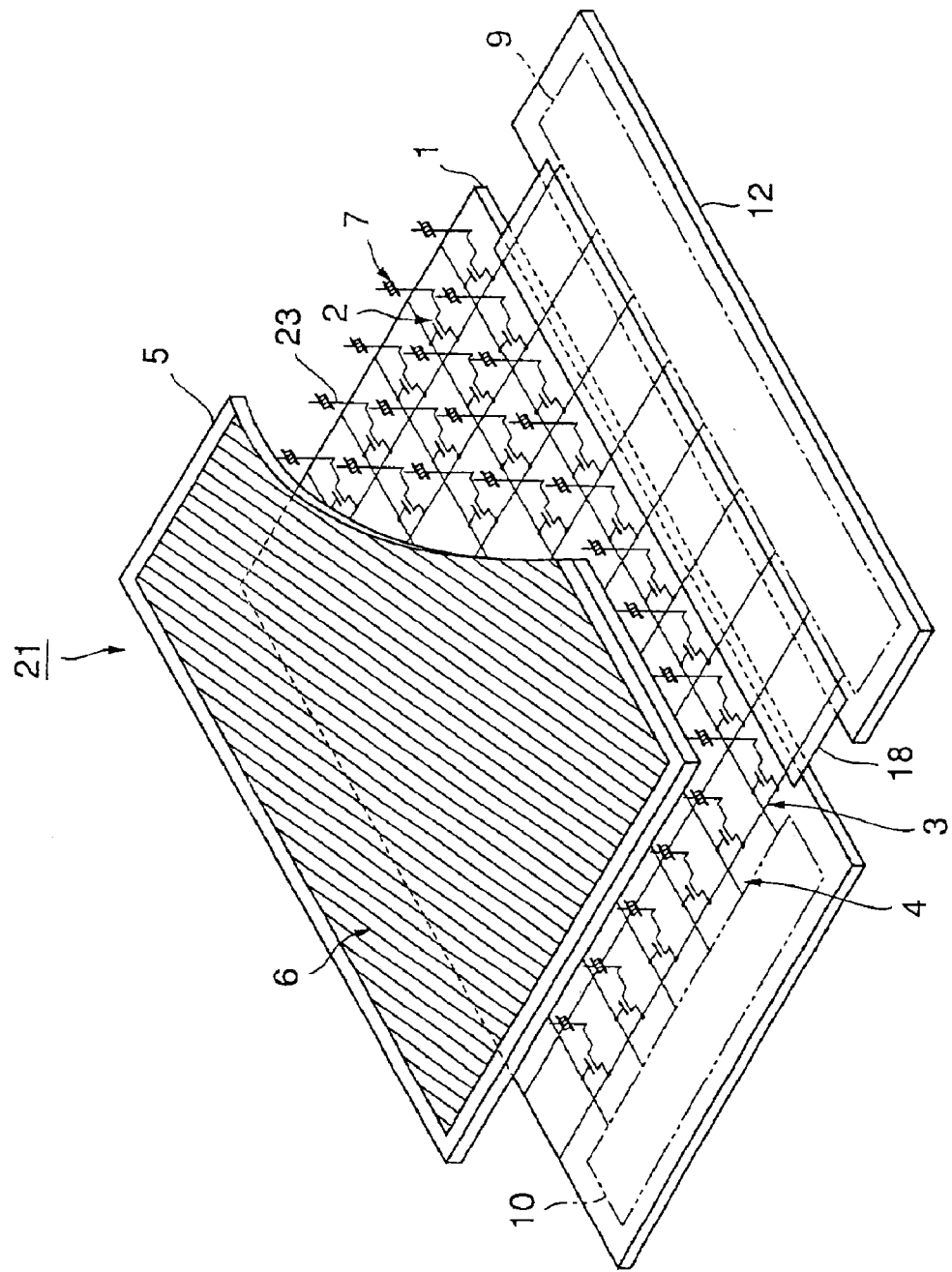
FIG. 3 is an illustration showing a structure of a liquid-crystal display unit according to an embodiment of the present invention.

FIG. 3 is an illustration showing a structure of a liquid-crystal display unit 21 according to an embodiment of the present invention. The liquid-crystal display unit 21 shown in FIG. 3 comprises the pixel electrode board (a first board) 1, the thin-film transistors (TFTs) 2, the signal lines 3, the scanning lines 4, the common electrode board (a second board) 5, the common electrode 6, the liquid-crystal layer 7, the signal-line drive circuit 9, the scanning-line drive circuit 10, a third board 12, a connecting portion 18, and the pixel electrodes 23. The TFTs 2, the signal lines 3, the scanning lines 4, the pixel electrodes 23, the common electrode 6, the liquid-crystal layer 7 provided between the pixel electrodes 23 and the common electrode 6, compose a liquid-crystal panel.

Unlike the conventional liquid-crystal display unit 11 shown in FIG. 1, the TFTs 2, the pixel electrodes 23 each connected to the TFT 2, the signal lines 3, the scanning lines 4, and the scanning-line drive circuit 10 driving the scanning lines 4 are formed on the pixel electrode board 1, and the common electrode 6 is formed on the common electrode board 5; the signal-line drive circuit 9 driving the signal lines 3 is formed on the third board 12 separated physically from the pixel electrode board 1 and the common electrode board 5, and is connected to the signal lines 3 formed on the pixel electrode board 1 by the connecting portion 18.

The pixel electrodes 23 are formed in the form of a matrix on the pixel electrode board 1. The signal line 3 supplies an image signal to the pixel electrode 23. The scanning line 4 transmits a control signal to a gate of the TFT 2, the control signal turning on/off the TFT 2 which is connected to the pixel electrode 23 so as to regulate writing of data to each pixel.

Besides, the TFTs (thin-film transistors) 2 and transistors composing the signal-line drive circuit 9 and the scanning-line drive circuit 10 each have a semiconductor layer formed of polysilicon.

Figure 4:
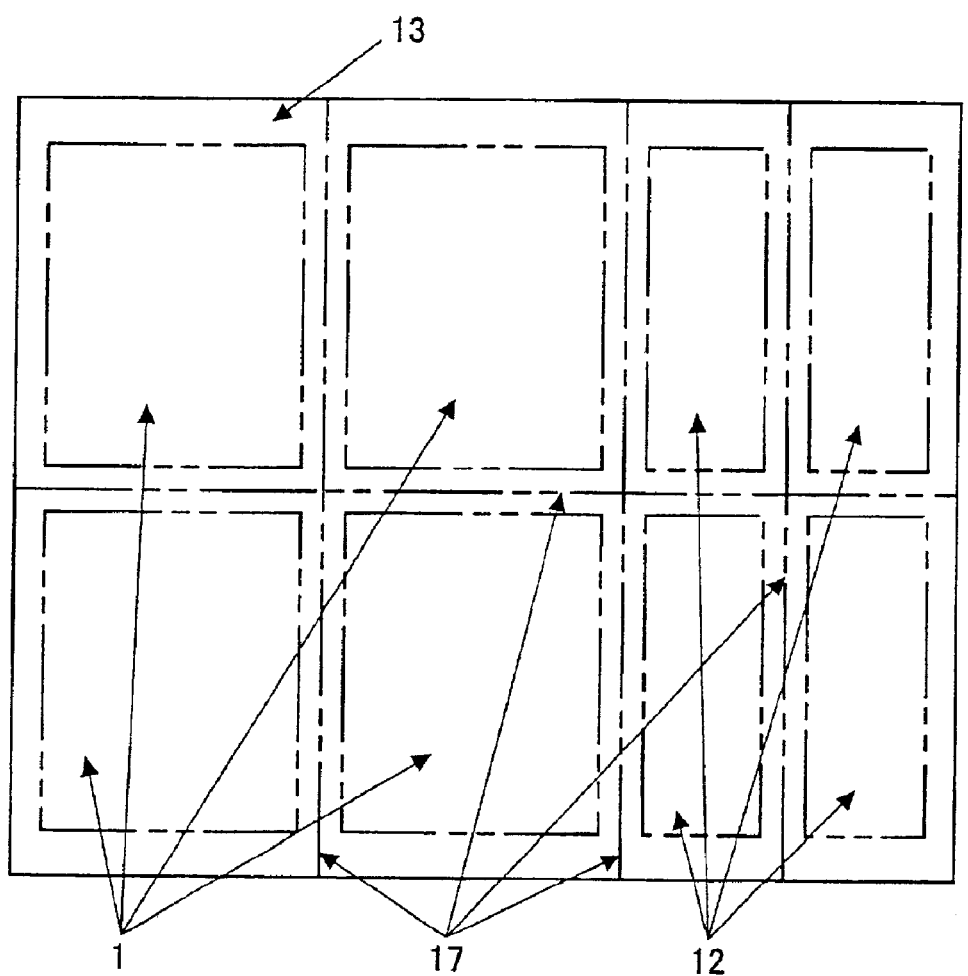
FIG. 4 is an illustration for explaining processes of manufacturing a third board and a pixel electrode board shown in FIG. 3.

FIG. 4 is an illustration for explaining processes of manufacturing the third board 12 and the pixel electrode board 1 shown in FIG. 3. In the above-mentioned structure, in a case where the third board 12 and the pixel electrode board 1 are formed of a same material, the signal-line drive circuit 9, the signal lines 3, the scanning lines 4, the TFTs 2, and the pixel electrodes 23 each connected to the TFT 2, can be formed, for example, on a same glass substrate 13 in a same process, as shown in FIG. 4, and then the glass substrate 13 can be severed along severing lines 17 into a plurality of the pixel electrode boards 1 each having the signal lines 3, the scanning lines 4, the TFTs 2 and the pixel electrodes 23 and a plurality of the third boards 12 each having the signal-line drive circuit 9, simultaneously in a same process.

Therefore, in this case, manufacturing costs of the pixel electrode board 1 and the third board 12 can be reduced so as to provide the liquid-crystal display unit 21 at a low cost.

Figure 5:
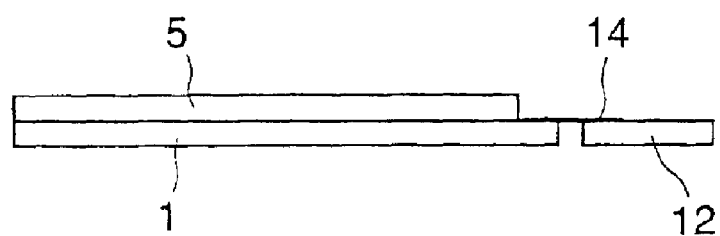
FIG. 5 is an illustration for explaining a first manner of connecting the pixel electrode board and the third board shown in FIG. 3.

Hereinbelow, a description will be given of manners of connecting the pixel electrode board 1 and the third board 12 shown in FIG. 3. First, as shown in FIG. 5, the pixel electrode board 1 and the third board 12 can be connected to each other by laying flexible cables 14 therebetween. In this manner, the flexible cables 14 are flexible and electrically conductive, and specifically, the flexible cables 14 connect the signal-line drive circuit 9 formed on the third board 12 to the signal lines 3 formed on the pixel electrode board 1.

Figure 6:
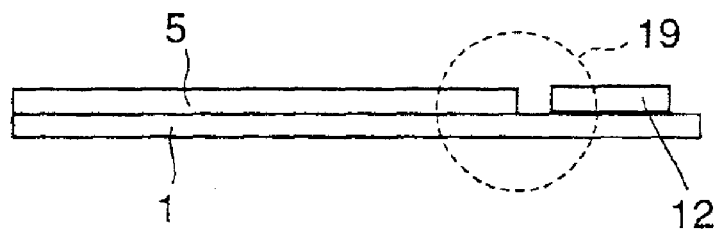
FIG. 6 is an illustration for explaining a second manner of connecting the pixel electrode board and the third board shown in FIG. 3.
Figure 7:
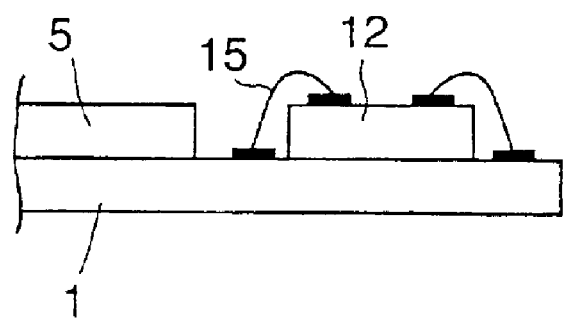
FIG. 7 is a magnified view of a first example of a connection part shown in FIG. 6.
Figure 8:
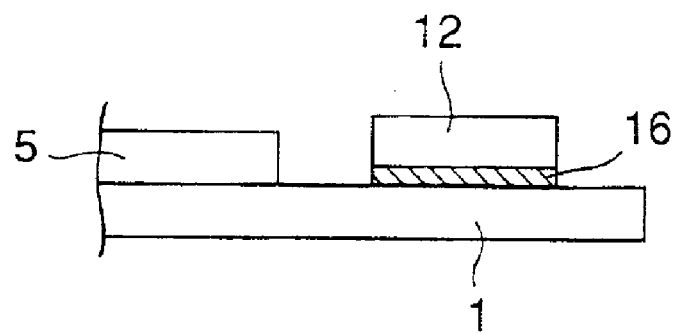
FIG. 8 is a magnified view of a second example of the connection part shown in FIG. 6.

Also, as shown in FIG. 6, the pixel electrode board 1 and the third board 12 can be connected to each other by providing the common electrode board 5 and the third board 12 on the pixel electrode board 1 and connecting the pixel electrode board 1 and the third board 12 in a connection part 19. FIG. 7 and FIG. 8 are magnified views of the connection part 19. Specifically, as shown in FIG. 7, the third board 12 and the pixel electrode board 1 can be connected to each other by a wire-bonding 15. Also, as shown in FIG. 8, the third board 12 and the pixel electrode board 1 can be connected to each other by providing a flip-chip bonding 16 therebetween. The flip-chip bonding 16 can be formed of such a material as a solder bump, an anisotropic conductive resin, or an anisotropic conductive rubber.

As described above, in the liquid-crystal display unit 21 according to the present embodiment, the signal-line drive circuit 9 is formed on the third board 12 that is made of the same material as the pixel electrode board 1 and is separated from the pixel electrode board 1 and the common electrode board 5. Therefore, even if the pixel electrode board 1 is manufactured inferiorly, the third board 12 is still usable, as long as the third board 12 is manufactured normally. Also, conversely, even if the third board 12 is manufactured inferiorly, the pixel electrode board 1 is still usable, as long as the pixel electrode board 1 is manufactured normally.

Accordingly, the pixel electrode board 1, the common electrode board 5 and the third board 12 can be manufactured without being influenced by each other being manufactured inferiorly; thus the liquid-crystal display unit 21 can have an increased yield rate.

In addition, the pixel electrode board 1 and the third board 12 are formed of the same material, as described above, so that electrical connection is made between the boards having an equal coefficient of thermal expansion. Therefore, the liquid-crystal display unit 21 can provide an enhanced reliability in operation at varying temperatures.

It should be noted that, although the above-described embodiment discloses the liquid-crystal display unit 21 having only the signal-line drive circuit 9 formed on the third board 12, forming the scanning-line drive circuit 10 in place of the signal-line drive circuit 9 on the third board 12 can provide the same effects and advantages. Further, forming the signal-line drive circuit 9 and the scanning-line drive circuit 10 unitarily or separately on the third board 12 can also provide the same effects and advantages.

The present invention is not limited to the specifically disclosed embodiments, and variations and modifications may be made without departing from the scope of the present invention.

The present application is based on Japanese priority application No. 2000-391366 filed on Dec. 22, 2000, the entire contents of which are hereby incorporated by reference.

What is claimed is:

1. A liquid-crystal display unit comprising:
   a first board having at least one signal line, at least one scanning line and at least one pixel electrode;

a second board having a common electrode, said second board opposing said first board;

a liquid-crystal layer provided between said first board and said second board; and a third board having at least one of a signal-line driver driving said at least one signal line and a scanning-line driver driving said at least one scanning line, said third board being separate from said first board and said second board, wherein said third board is formed of a same material in a same process as said first board, and is divided from said first board.

2. The liquid-crystal display unit as claimed in claim 1, wherein said third board is connected to said first board by a flexible cable.

3. The liquid-crystal display unit as claimed in claim 1, wherein said third board is connected to said first board by a wire bonding.

4. The liquid-crystal display unit as claimed in claim 1, wherein said third board is connected to said first board by a flip-chip bonding.

* * * * *